United States Patent
Sugawara

(10) Patent No.: US 9,407,884 B2
(45) Date of Patent: Aug. 2, 2016

(54) IMAGE PICKUP APPARATUS, CONTROL METHOD THEREFORE AND STORAGE MEDIUM EMPLOYING PHASE DIFFERENCE PIXELS

(71) Applicant: FUJIFILM Corporation, Tokyo (JP)

(72) Inventor: Kazufumi Sugawara, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/726,723

(22) Filed: Jun. 1, 2015

(65) Prior Publication Data

US 2015/0264324 A1    Sep. 17, 2015

Related U.S. Application Data

(63) Continuation of application No. PCT/JP2013/080493, filed on Nov. 12, 2013.

(30) Foreign Application Priority Data

Dec. 11, 2012 (JP) ................................. 2012-270466

(51) Int. Cl.
*H04N 9/04* (2006.01)
*H04N 5/369* (2011.01)
*G06T 7/00* (2006.01)
*G06T 3/40* (2006.01)

(52) U.S. Cl.
CPC ................ *H04N 9/045* (2013.01); *G06T 3/403* (2013.01); *G06T 3/4007* (2013.01); *G06T 7/0085* (2013.01); *H04N 5/3696* (2013.01); *G06T 2207/10024* (2013.01); *G06T 2207/10148* (2013.01); *H04N 2209/046* (2013.01)

(58) Field of Classification Search
CPC ................ H04N 9/045; H04N 5/3696; H04N 2209/046; G06T 3/4007; G06T 3/403; G06T 7/0085; G06T 2207/10024; G06T 2207/10148
See application file for complete search history.

(56) References Cited

U.S. PATENT DOCUMENTS

2005/0093992 A1* 5/2005 Fukumoto ............... G06T 7/408
                                                                348/222.1
2010/0214452 A1* 8/2010 Kawarada .............. G02B 7/346
                                                                348/255

(Continued)

FOREIGN PATENT DOCUMENTS

JP     2010-62640 A    3/2010
JP     2012-4729 A     1/2012

OTHER PUBLICATIONS

International Search Report, issued in PCT/JP2013/080493, dated Feb. 4, 2014.

(Continued)

*Primary Examiner* — Mekonnen Dagnew
(74) *Attorney, Agent, or Firm* — Birch, Stewart, Kolasch & Birch, LLP

(57) ABSTRACT

A digital signal processing unit 17 extracts a determination block which includes a predetermined number of pixels and has a pixel to be corrected as the center. When an edge of an object image is present in each determination block, the direction of the edge is a direction perpendicular to a direction in which a phase difference is detected by the phase difference detecting pixel, and the edge overlaps the pixel to be corrected, the digital signal processing unit 17 performs interpolation correction for an output signal from the pixel to be corrected in the block.

13 Claims, 15 Drawing Sheets

(56) References Cited

U.S. PATENT DOCUMENTS

2011/0109775 A1* 5/2011 Amano .............. H04N 5/23212
348/241
2013/0329132 A1* 12/2013 Tico ........................ H04N 5/14
348/571
2015/0319358 A1* 11/2015 Okazawa ........... H04N 5/23212
348/279

OTHER PUBLICATIONS

Written Opinion of the International Searching Authority, issued in PCT/JP2013/080493, dated Feb. 4, 2014.

* cited by examiner

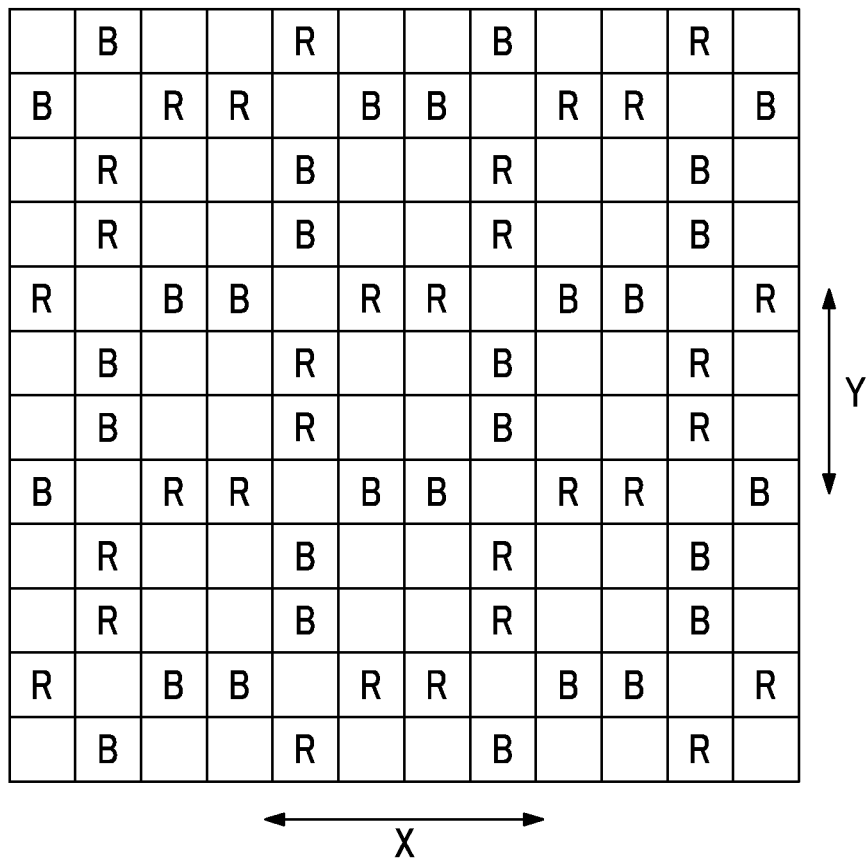

IMAGE PICKUP APPARATUS, CONTROL METHOD THEREFORE AND STORAGE MEDIUM EMPLOYING PHASE DIFFERENCE PIXELS

CROSS REFERENCE TO RELATED APPLICATIONS

This application is a Continuation of PCT International Application No. PCT/JP2013/080493 filed on Nov. 12, 2013, which claims priority under 35 U.S.C §119(a) to Japanese Patent Application No. 2012-270466 filed on Dec. 11, 2012, all of which are hereby expressly incorporated by reference into the present application.

BACKGROUND OF THE INVENTION

1. Field of the Invention

The present invention relates to an image processing device, an image capture device, an image processing method, and an image processing program.

2. Description of the Related Art

A plurality of light receiving elements (photoelectric conversion elements) are formed in a two-dimensional array on a light receiving surface of a solid-state imaging element. Among the light receiving elements, some light receiving elements are used as phase difference detecting pixels. The solid-state imaging element can detect the distance to a main object in a captured image from distance measuring signals detected by the phase difference detecting pixels (for example, JP2010-62640A and JP2012-4729A). An image capture device using the solid-state imaging element can perform a phase difference AF process on the basis of the signals detected by the phase difference detecting pixels.

The phase difference detecting pixel has a different structure from the light receiving element (hereinafter, referred to as an imaging pixel) other than the phase difference detecting pixel on the light receiving surface. As disclosed in JP2010-62640A and JP2012-4729A, in the phase difference detecting pixel, the size of an opening in a light shielding film is less than that in the imaging pixel. Therefore, the amount of light received by the phase difference detecting pixel is less than the amount of light received by the imaging pixel. That is, when an image is generated, considering the distance measuring signal detected by the phase difference detecting pixel and the signal detected by the imaging pixel as the same signal, image data at the position of the phase difference detecting pixel is degraded as compared to image data around the phase difference detecting pixel on the light receiving surface.

When the image data of an object is generated, it is necessary to correct the image data at the position of the phase difference detecting pixel. As disclosed in JP2012-4729A, there are two types of correction method, that is, gain correction and interpolation correction other than the gain correction.

The gain correction is a method which multiplies the value of the signal detected by the phase difference detecting pixel by a predetermined gain to correct the signal. For example, in the gain correction, the value of the signal detected by the phase difference detecting pixel is multiplied by a gain based on the ratio between the amount of opening of the light shielding film in the phase difference detecting pixel and the amount of opening of the light shielding film in the imaging pixel.

The interpolation correction is a correction method which treats the phase difference detecting pixel as a defect pixel and replaces image data at the position of the phase difference detecting pixel with the average value (for example, the weighted average value) of the output signals from the imaging pixels in the vicinity of the phase difference detecting pixel.

The interpolation correction and the gain correction have advantages and disadvantages and are appropriately used according to a captured scene. The technique disclosed in JP2012-4729A detects the edge of the object image, switches between the interpolation correction and the gain correction according to the amount of edge, and corrects image data.

SUMMARY OF THE INVENTION

As disclosed in JP2012-4729A, when the correction method is switched according to the amount of edge in the object image, it is possible to improve the quality of the object image. However, the switching of the correction method according to the amount of edge is insufficient to further improve the image quality.

An object of the invention is to provide an image processing device, an image processing method, an image capture device, and an image processing program which can appropriately correct an output signal from a phase difference detecting pixel to generate a high-quality object image.

According to an aspect of the invention, there is provided an image processing device that processes a captured image signal output from a solid-state imaging element including a plurality of imaging pixels and a plurality of phase difference detecting pixels which are arranged in a two-dimensional array on a light receiving surface. The image processing device includes: a gain correction processing unit that performs a gain correction process of multiplying an output signal from the phase difference detecting pixel, which is included in the captured image signal, by a gain value to correct the output signal; an interpolation correction processing unit that performs an interpolation correction process of replacing the output signal from the phase difference detecting pixel, which is included in the captured image signal, with a signal that is generated using an output signal from the imaging pixel, which is arranged in the vicinity of the phase difference detecting pixel and detects the same color as the phase difference detecting pixel, to correct the output signal from the phase difference detecting pixel; and a correction unit that corrects each of the output signals from the plurality of phase difference detecting pixels, which are included in the captured image signal, using the gain correction processing unit or the interpolation correction processing unit. The correction unit corrects the output signal from the phase difference detecting pixel to be corrected, using the interpolation correction processing unit, in a first case in which an edge of an object image that extends in a direction perpendicular to a direction in which a phase difference is detected by the phase difference detecting pixel is present in a determination area including the phase difference detecting pixel to be corrected and the plurality of imaging pixels which are arranged in the vicinity of the phase difference detecting pixel to be corrected and detect the same color as the phase difference detecting pixel to be corrected or a second case in which the edge of the object image that extends in the direction perpendicular to the direction in which the phase difference is detected is present in the determination area and overlaps the phase difference detecting pixel to be corrected.

According to another aspect of the invention, there is provided an image capture device including the image processing device and the solid-state imaging element.

According to still another aspect of the invention, there is provided an image processing method that processes a captured image signal output from a solid-state imaging element including a plurality of imaging pixels and a plurality of phase difference detecting pixels which are arranged in a two-dimensional array on a light receiving surface. The image processing method includes a correction step of correcting each of output signals from the plurality of phase difference detecting pixels, which are included in the captured image signal, using a gain correction process of multiplying the output signal by a gain value to correct the output signal or an interpolation correction process of replacing the output signal from the phase difference detecting pixel with a signal that is generated using an output signal from the imaging pixel, which is arranged in the vicinity the phase difference detecting pixel and detects the same color as the phase difference detecting pixel, to correct the output signal. In the correction step, the output signal from the phase difference detecting pixel to be corrected is corrected using the interpolation correction process, in a first case in which an edge of an object image that extends in a direction perpendicular to a direction in which a phase difference is detected by the phase difference detecting pixel is present in a determination area including the phase difference detecting pixel to be corrected and the plurality of imaging pixels which are arranged in the vicinity of the phase difference detecting pixel to be corrected and detect the same color as the phase difference detecting pixel to be corrected or a second case in which the edge of the object image that extends in the direction perpendicular to the direction in which the phase difference is detected is present in the determination area and overlaps the phase difference detecting pixel to be corrected.

According to yet another aspect of the invention, there is provided an image processing program that causes a computer to process a captured image signal output from a solid-state imaging element including a plurality of imaging pixels and a plurality of phase difference detecting pixels which are arranged in a two-dimensional array on a light receiving surface. The image processing program causes the computer to perform a correction step of correcting each of output signals from the plurality of phase difference detecting pixels, which are included in the captured image signal, using a gain correction process of multiplying the output signal by a gain value to correct the output signal or an interpolation correction process of replacing the output signal from the phase difference detecting pixel with a signal that is generated using an output signal from the imaging pixel, which is arranged in the vicinity of the phase difference detecting pixel and detects the same color as the phase difference detecting pixel, to correct the output signal. In the correction step, the output signal from the phase difference detecting pixel to be corrected is corrected using the interpolation correction process, in a first case in which an edge of an object image that extends in a direction perpendicular to a direction in which a phase difference is detected by the phase difference detecting pixel is present in a determination area including the phase difference detecting pixel to be corrected and the plurality of imaging pixels which are arranged in the vicinity of the phase difference detecting pixel to be corrected and detect the same color as the phase difference detecting pixel to be corrected or a second case in which the edge of the object image that extends in the direction perpendicular to the direction in which the phase difference is detected is present in the determination area and overlaps the phase difference detecting pixel to be corrected.

According to the invention, it is possible to provide an image processing device, an image processing method, an image capture device, and an image processing program which can appropriately correct an output signal from a phase difference detecting pixel to generate a high-quality object image.

BRIEF DESCRIPTION OF THE DRAWINGS

FIGS. 3A to 3C are diagrams illustrating a modification example of the pixel array illustrated in FIGS. 2A to 2C.

DESCRIPTION OF THE PREFERRED EMBODIMENTS

Hereinafter, an embodiment of the invention will be described with reference to the drawings.

Figure 1:
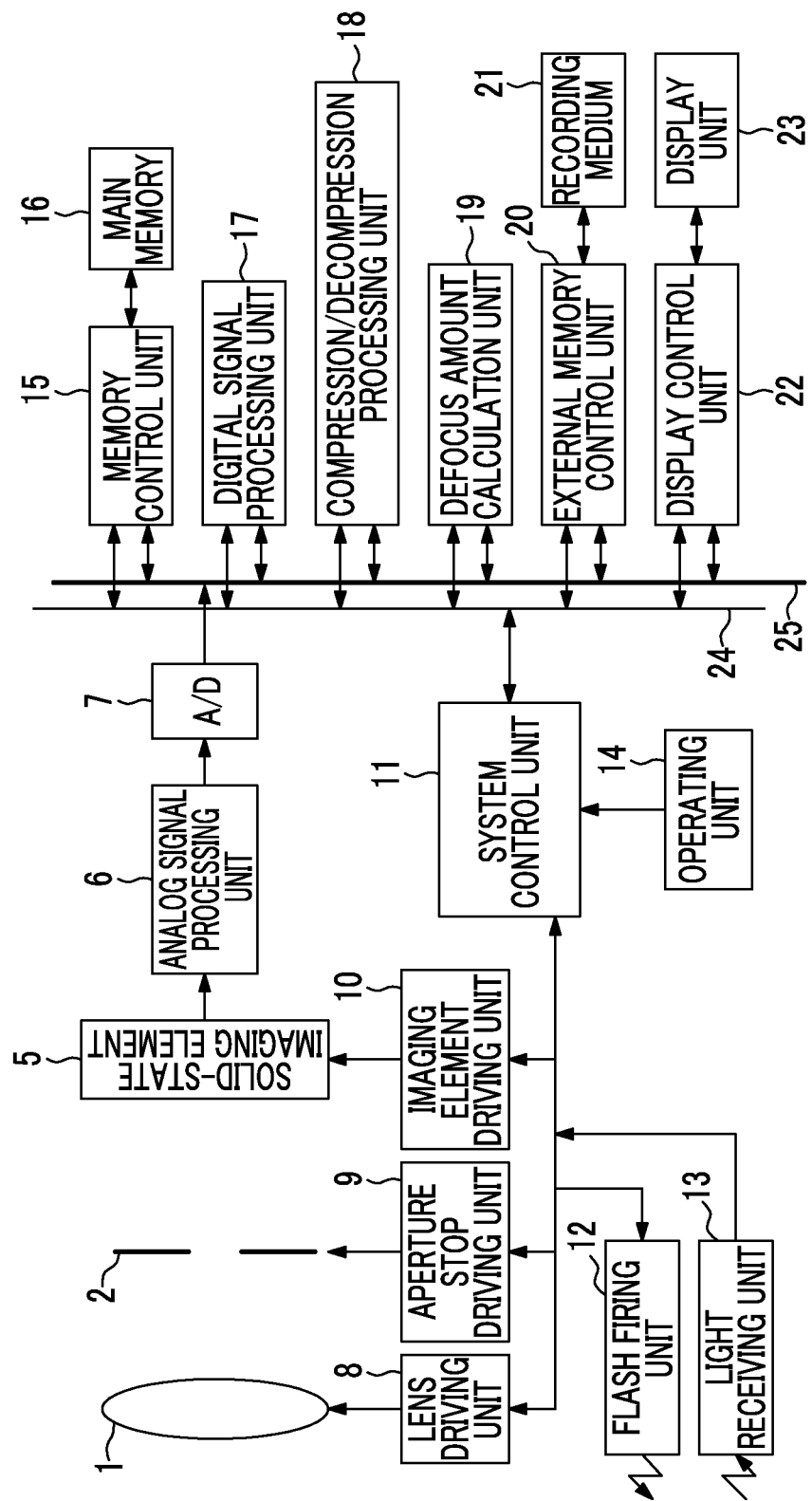
FIG. 1 is a functional block diagram illustrating a digital camera according to an embodiment of the invention.

FIG. 1 is a diagram illustrating the schematic structure of a digital camera as an example of an image capture device according to an embodiment of the invention. An imaging system of the digital camera illustrated in FIG. 1 includes a lens device (including an imaging lens 1 and an aperture stop 2) as an imaging optical system and a solid-state imaging element 5 of, for example, a CCD type or a CMOS type. The solid-state imaging element 5 is a low-pass-filterless solid-state imaging element without an optical low-pass filter. The lens device including the imaging lens 1 and the aperture stop 2 is detachable from a camera body or is fixed to the camera body.

A system control unit 11 which controls the entire electrical control system of the digital camera controls a flash firing unit 12 and a light receiving unit 13. In addition, the system control unit 11 controls a lens driving unit 8 to adjust the position of a focus lens included in the imaging lens 1 or to adjust the position of a zoom lens included in the imaging lens 1. The system control unit 11 controls the amount of opening of the aperture stop 2 through the aperture stop driving unit 9 to adjust the amount of exposure.

The system control unit 11 drives the solid-state imaging element 5 through the solid-state imaging element driving unit 10 such that an object image captured through the imaging lens 1 is output as a captured image signal. An instruction signal from the user is input to the system control unit 11 through an operating unit 14.

The electrical control system of the digital camera further includes an analog signal processing unit 6 which is connected to the output of the solid-state imaging element 5 and performs analog signal processing, such as a correlated double sampling process, and an A/D conversion circuit 7 which converts an analog signal output from the analog signal processing unit 6 into a digital signal. The analog signal processing unit 6 and the A/D conversion circuit 7 are controlled by the system control unit 11. The analog signal processing unit 6 and the A/D conversion circuit 7 may be provided in the solid-state imaging element 5.

The electrical control system of the digital camera further includes a main memory 16, a memory control unit 15 which is connected to the main memory 16, a digital signal processing unit 17 which performs, for example, a synchronization process (demosaic process), a gamma correction process, and an RGB/YC conversion process on the captured image signal output from the A/D conversion circuit 7 to generate captured image data, a compression/decompression processing unit 18, a defocus amount calculation unit 19 which calculates the amount of defocus to a main object from each signal detected by phase difference detecting pixel groups that are arranged in a predetermined array pattern on a light receiving surface of the solid-state imaging element 5, an external memory control unit 20 which is connected to a detachable recording medium 21, and a display control unit 22 which is connected to a display unit 23 provided on, for example, the rear surface of the camera.

The memory control unit 15, the digital signal processing unit 17, the compression/decompression processing unit 18, the defocus amount calculation unit 19, the external memory control unit 20, and the display control unit 22 are connected to each other by a control bus 24 and a data bus 25 and are controlled by instructions from the system control unit 11.

Figures 2A, 2B, 2C:
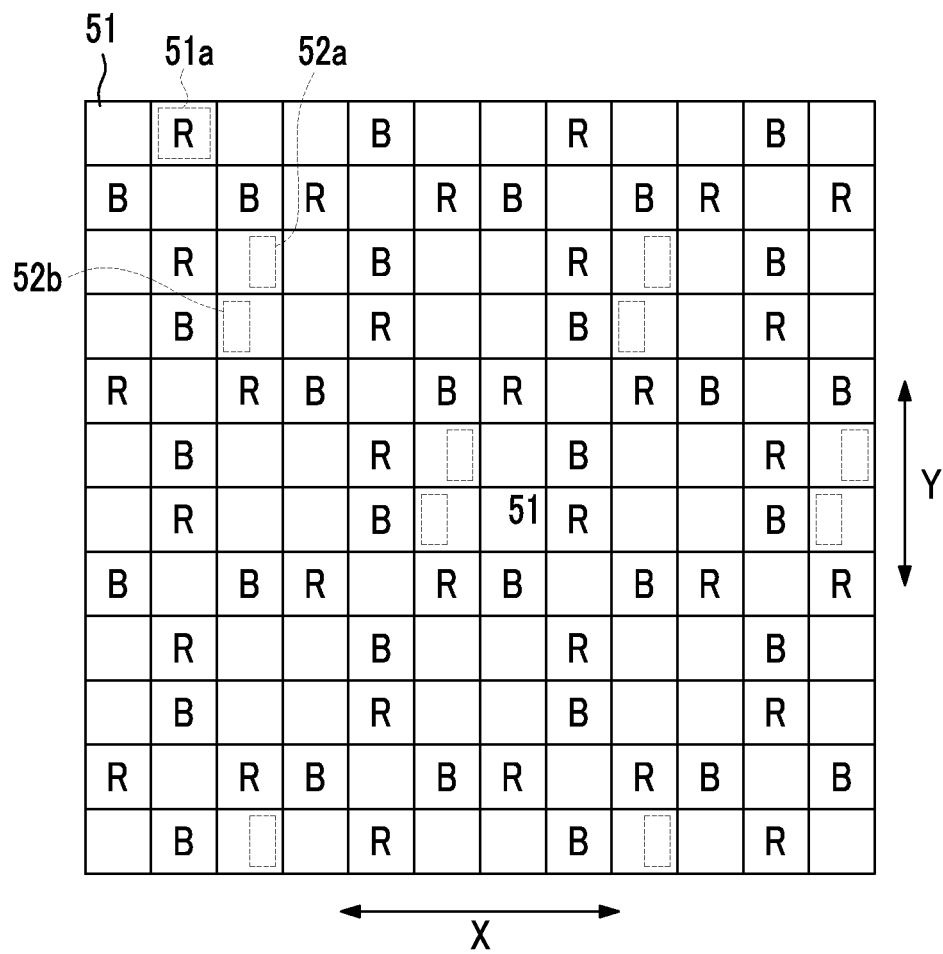
FIGS. 2A to 2C are diagrams illustrating the pixel array of a solid-state imaging element illustrated in FIG. 1.

FIG. 2A is a partial enlarged view illustrating the planar structure of the solid-state imaging element 5 illustrated in FIG. 1. FIG. 2A illustrates a portion with a size of 12 pixels× 12 pixels. Each rectangular frame 51 indicates each pixel (light receiving element). In the solid-state imaging element 5, the pixels 51 are arranged in a two-dimensional array pattern in a row direction X and a column direction Y perpendicular to the row direction X. In FIG. 2A, not all of the pixels 51 are illustrated. In practice, several millions of to a dozen million pixels 51 are two-dimensionally arranged.

When an image is captured by the solid-state imaging element 5, output signals are obtained from the plurality of pixels 51. Each pixel 51 includes a photoelectric conversion unit, such as a photodiode, and an opening of a light shielding film and a color filter which are formed above the photoelectric conversion unit in a light incident direction. In some cases, a microlens (top lens) is stacked on each pixel 51.

In FIG. 2A, an empty rectangular frame indicates a G pixel (a pixel provided with a green color filter) and is not represented by letter "G" for ease of viewing of the drawings. In FIGS. 2A to 2C, a rectangular frame represented by "R" is an R pixel (a pixel provided with a red color filter). In FIGS. 2A to 2C, a rectangular frame represented by "B" is a B pixel (a pixel provided with a blue color filter).

The pixel array illustrated in FIG. 2A is formed by alternately and repeatedly arranging a first array illustrated in FIG. 2B and a second array illustrated in FIG. 2C in the horizontal direction and the vertical direction.

In the first array illustrated in FIG. 2B, five pixels which are located at the center and four corners of a 3×3 pixel group are G pixels. Among four pixels other than the five pixels, two pixels in the same pixel column are R pixels and the remaining two pixels are B pixels.

The second array illustrated in FIG. 2C has an array pattern in which, among four pixels other than five pixels which are located at the center and four corners of a 3×3 pixel group are G pixels, and two pixels among four pixels other than five pixels are in the same pixel row are R pixels and the remaining two pixels are B pixels.

When the first array and the second array illustrated in FIGS. 2B and 2C are alternately arranged in the horizontal direction and the vertical direction, pixel arrays, each having a size of 6 pixels×6 pixels, are repeatedly arranged in the horizontal direction and the vertical direction and clusters each having four G pixels are discretely and periodically formed.

An array in which only the first array illustrated in FIG. 2B is repeatedly arranged in the horizontal direction and the vertical direction is considered as a modification example of the pixel array illustrated in FIG. 2A. In addition, an array may be considered in which only the second array illustrated in FIG. 2C is repeatedly arranged in the horizontal direction and the vertical direction. In any case, the G pixel is located at the same position.

FIG. 3A is a diagram illustrating another modification example of the pixel array illustrated in FIG. 2A. The array according to the modification example is formed by alternately arranging a first array illustrated in FIG. 3B and a second array illustrated in FIG. 3C in the horizontal direction and the vertical direction.

In the first array illustrated in FIG. 3B, five pixels which are located at the center and four corners of a 3×3 pixel group are G pixels and four pixels other than the five pixels are divided into two sets of two pixels which are adjacent to each other in an oblique direction. One set of two pixels are R pixels and the other set of two pixels are B pixels. When one set of two pixels are B pixels and the other set of two pixels are R pixels, the second array illustrated in FIG. 3C is formed.

Similarly to the above, a pixel array in which only the first array illustrated in FIG. 3B or the second array illustrated in FIG. 3C is repeatedly arranged in the horizontal direction and the vertical direction is considered as a modification example of the pixel array illustrated in FIG. 3A. In this modification example, lumps each having four G pixels are discretely and periodically formed.

The solid-state imaging element 5 according to this embodiment has the pixel arrays illustrated in FIGS. 2 and 3 because it does not have an optical low-pass filter.

In the solid-state imaging element with an optical low-pass filter according to the related art, since the optical low-pass filter is provided, for example, the occurrence of moire fringes is suppressed and image quality is improved. However, this structure has the disadvantage that image resolution corresponding to the number of pixels of the solid-state imaging element is sacrificed.

In the pixel array of the solid-state imaging element 5 according to this embodiment illustrated in FIGS. 2 and 3, a first filter (G filter) corresponding to a first color (G) which most contributes to obtaining a brightness signal is arranged in each line of the pixel array in the horizontal, vertical, and oblique directions. In addition, the proportion of the number of pixels of the first color corresponding to the first filters is higher than the proportion of the number of pixels of second colors (B and R) corresponding to the second filters (a B filter and an R filter) of two colors (B and R) other than the first color. This array makes it possible to improve the reproducibility of a synchronization process (demosaic process) in a high-frequency range and to suppress aliasing.

One or more second filters (B filters and R filters) corresponding to the second color (B and R) are arranged in each line of the pixel array in the 3×3 pixel group in the horizontal and vertical directions. Therefore, it is possible to suppress the occurrence of color moire (false color) and to improve resolution. As such, the solid-state imaging element 5 described with reference to FIGS. 2 and 3 can suppress the occurrence of moire fringes or aliasing distortion, without using an optical low-pass filter, and it is possible to obtain a high-resolution image corresponding to the number of pixels of the solid-state imaging element 5.

In addition, in the pixel array, a predetermined basic array pattern is repeated in the horizontal direction and the vertical direction. Therefore, when the synchronization process is performed in the subsequent stage, it is possible to perform the process according to the repeated pattern and to simplify the subsequent process, as compared to the random array according to the related art.

In the following description, it is assumed that the solid-state imaging element 5 has the pixel array illustrated in FIG. 2A.

In FIG. 2A, a rectangular dotted frame 52a, a rectangular dotted frame 52b, and a rectangular dotted frame 51a indicate the openings of the light shielding film in the pixels. In FIG. 2A, only one rectangular dotted frame 51a is illustrated for ease of illustration.

The pixel including the opening indicated by the rectangular dotted frame 51a is an imaging pixel. The imaging pixel receives a pair of light components (for example, light components which pass through the left and right sides of the main axis of the imaging lens 1) which pass through different pupil regions of the imaging lens 1 illustrated in FIG. 1.

The pixel including the opening indicated by the rectangular dotted frame 52a and the pixel including the opening indicated by the rectangular dotted frame 52b are phase difference detecting pixels.

The phase difference detecting pixel having the opening indicated by the rectangular dotted frame 52a receives one of the pair of light components. In the phase difference detecting pixel, the opening of the light shielding film leans to the right, as compared to the imaging pixel.

The phase difference detecting pixel having the opening indicated by the rectangular dotted frame 52b receives the other of the pair of light components. In this phase difference detecting pixel, the opening of the light shielding film leans to the left, as compared to the imaging pixel.

The phase difference detecting pixel having the opening indicated by the rectangular dotted frame 52a and the phase difference detecting pixel having the opening indicated by the rectangular dotted frame 52b, which is adjacent to the phase difference detecting pixel having the opening indicated by the rectangular dotted frame 52a, form a phase difference detecting pixel pair. In the solid-state imaging element 5, the phase difference detecting pixel pairs are formed in a predetermined pattern in an AF detection area of the light receiving surface.

In FIG. 2A, the imaging pixel and the phase difference detecting pixel have the same size and the size of each of the openings 52a and 52b of the light shielding films in the phase difference detecting pixel pair is different from that in the imaging pixel. In addition, each of the openings leans to one side. This structure makes it possible to detect a phase difference.

However, the structure of the phase difference detecting pixels for detecting the phase difference is not limited thereto. For example, the imaging pixel may be divided into two pixels and two divided pixels may form the phase difference detecting pixel pair.

Figure 4:
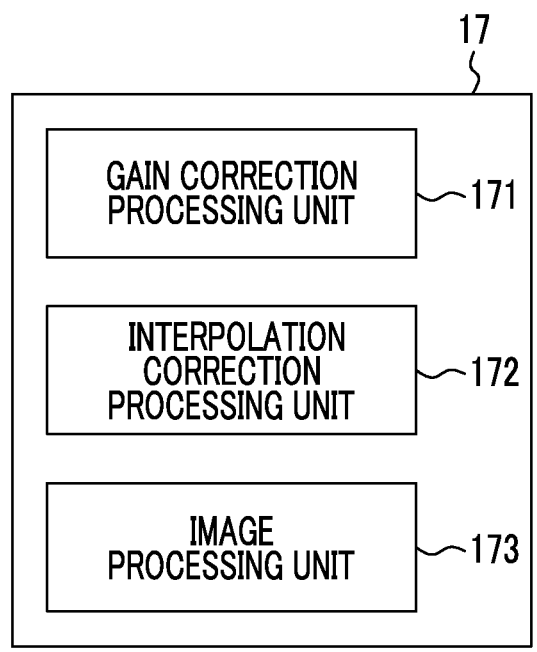
FIG. 4 is a functional block diagram illustrating the internal structure of a digital signal processing unit illustrated in FIG. 1.

FIG. 4 is a functional block diagram illustrating the digital signal processing unit 17 of the digital camera illustrated in FIG. 1.

The digital signal processing unit 17 includes a gain correction processing unit 171, an interpolation correction processing unit 172, and an image processing unit 173. These units are function blocks which are formed by the execution of a program by a processor included in the digital signal processing unit 17.

The gain correction processing unit 171 performs a gain correction process which multiplies an output signal from the phase difference detecting pixel to be corrected (hereinafter, referred to as a pixel to be corrected), which is included in the captured image signal, by a gain value to correct the output signal.

The gain value can be calculated from the captured image signal which is obtained by the solid-state imaging element 5. The captured image signal may be obtained by capturing a reference image in an adjustment process before the shipment of the digital camera or it may be obtained by an imaging operation for displaying a live view image. The gain value is calculated by, for example, the following method: the light receiving surface of the solid-state imaging element is divided into a plurality of blocks including the phase difference detecting pixel and the imaging pixel; and the ratio of the average value of signals output from the phase difference detecting pixels which detect the same phase difference and the average value of signals output from the imaging pixels which detect the same color as the phase difference detecting pixels in each block is calculated.

The interpolation correction processing unit 172 replaces the output signal from the pixel to be corrected with a signal that is generated by calculation using the output signal from the imaging pixel, which is arranged in the vicinity the pixel to be corrected and detects the same color as the pixel to be corrected, to correct the output signal.

The image processing unit 173 corrects the output signal from the phase difference detecting pixel in the captured image signal which is output from the solid-state imaging element 5, using the gain correction processing unit 171 or the interpolation correction processing unit 172, and records the corrected captured image signal in the main memory 16. Then, the image processing unit 174 performs known image processing, such as a demosaic process, a gamma (γ) correction process, and a white balance adjustment process, on the recorded captured image signal to generate captured image data and records the captured image data in the recording medium 21.

In addition, the image processing unit 173 may record the corrected captured image signal as RAW data in the recording medium 21.

Figure 5:
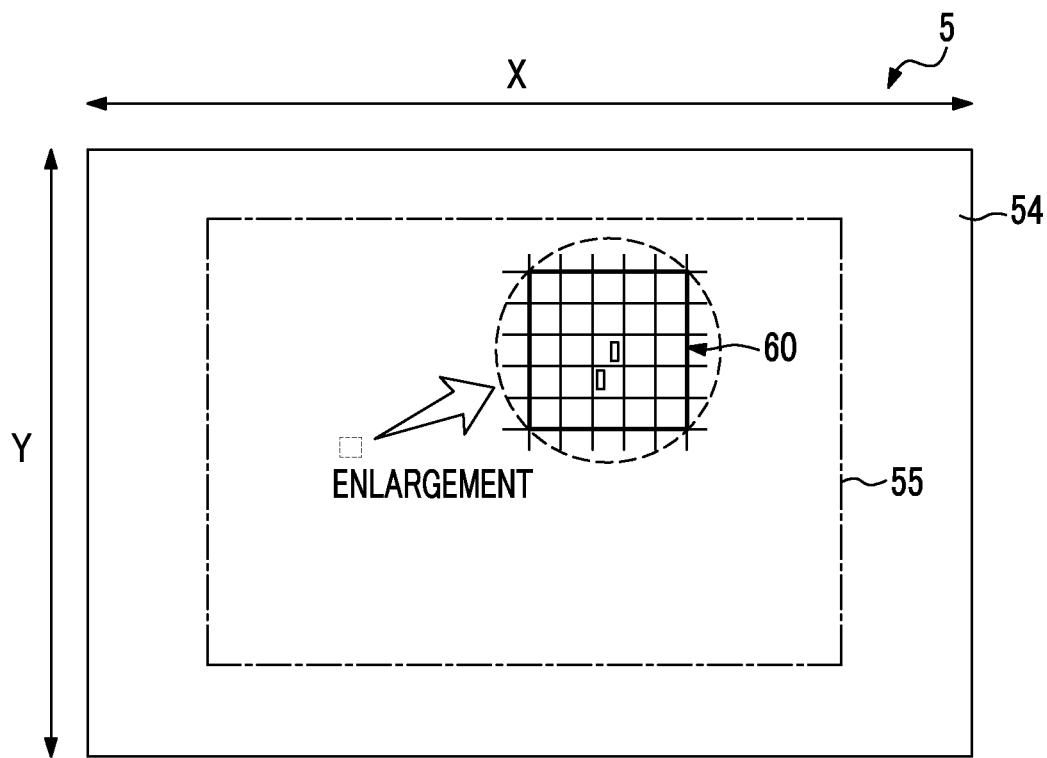
FIG. 5 is a diagram illustrating a light receiving surface of the solid-state imaging element illustrated in FIG. 1.

FIG. 5 is a diagram illustrating the entire light receiving surface 54 of the solid-state imaging element 5. Several millions of to a dozen million pixels are arranged in a two-dimensional array on the light receiving surface 54.

The phase difference detecting pixel pairs are formed in a predetermined pattern in an AF area 55 which is provided at the center of the light receiving surface 54 and is used to detect a focus. The digital signal processing unit 17 acquires the output signals from the phase difference detecting pixels in the AF area 55 from the solid-state imaging element 5.

A necessary process, such as an offset process, is performed on the output signals from the phase difference detecting pixels which are acquired by the digital signal processing unit 17. Then, the processed signals are transmitted to the defocus amount calculation unit 19 and the defocus amount calculation unit 19 calculates the amount of defocus. The system control unit 11 outputs an instruction to the lens driving unit 8 on the basis of the amount of defocus to control the position of the focus lens forming the imaging lens 1 such that an object image focused on the main object is formed on the light receiving surface of the solid-state imaging element 5.

The distance to the object is measured on the basis of the signals output from the phase difference detecting pixels of the solid-state imaging element 5 as described above and the image of the object is generated from the signals output from the imaging pixels and the phase difference detecting pixels of the solid-state imaging element 5.

When the image of the object is generated, there are two methods for calculating a signal indicating the position of the phase difference detecting pixel, as described above.

The first method is interpolation correction and the second method is gain correction. Which of the interpolation correction and the gain correction is preferable depends on a captured scene of a region in which the phase difference detecting pixels are present. Therefore, it is preferable to switch between the interpolation correction and the gain correction depending on the captured scene.

Figure 6:
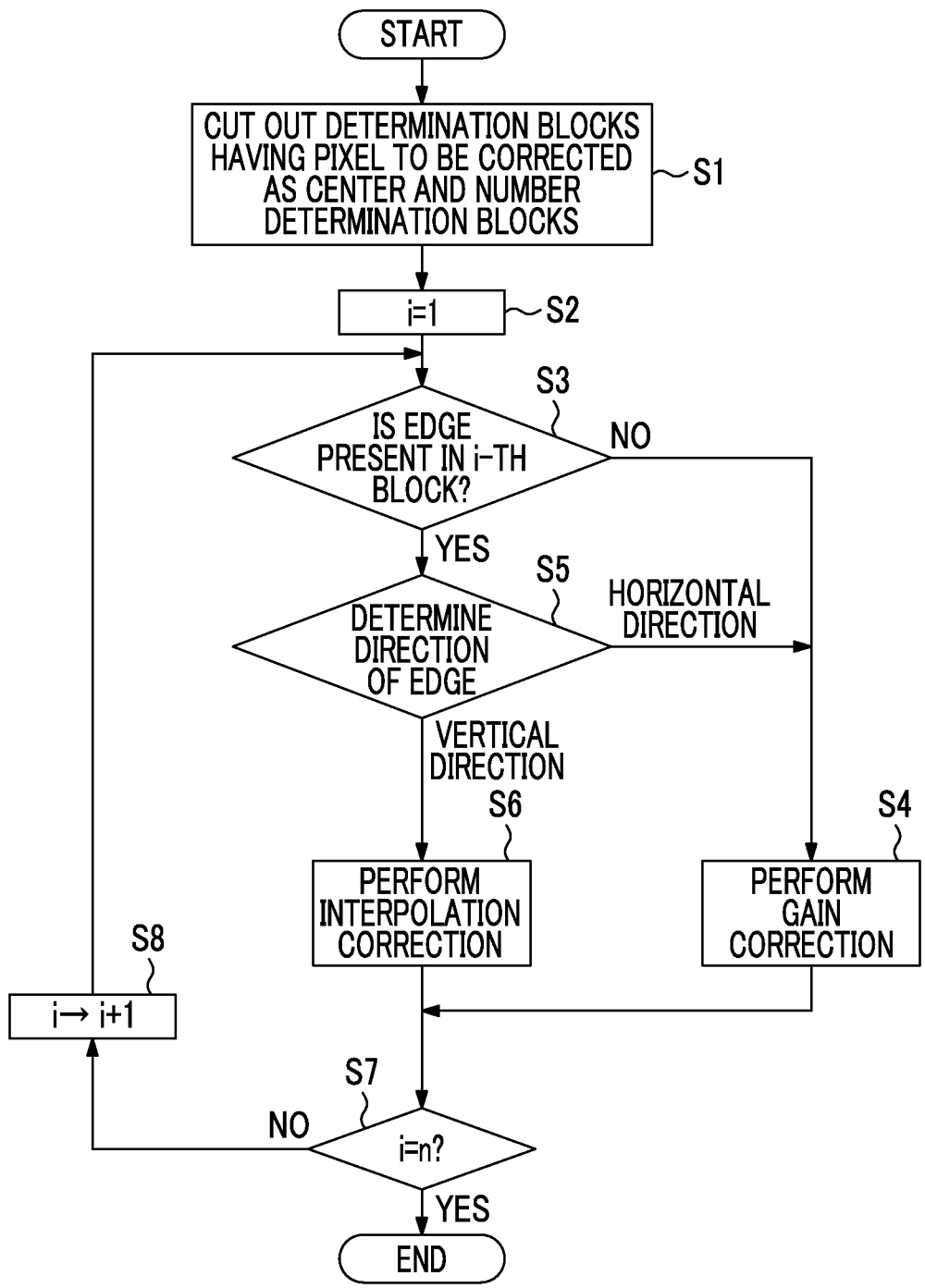
FIG. 6 is a flowchart illustrating the procedure of image processing according to an embodiment of the invention.

FIG. 6 is a flowchart illustrating the operation of the digital signal processing unit 17 correcting the output signal from the phase difference detecting pixel in the digital camera illustrated in FIG. 1. The steps illustrated in FIG. 6 are performed by the digital signal processing unit 17 illustrated in FIG. 1 in response to instructions from the system control unit 11.

First, the image processing unit 173 cuts out determination blocks for each phase difference detecting pixel from the AF area 55 having the phase difference detecting pixels provided therein and gives numbers (i=1 to n) to each block (Step S1).

Here, the determination block means, for example, a cutout block which has, as the center, the phase difference detecting pixel to be corrected (the pixel to be corrected) among the phase difference detecting pixels. In the example illustrated in FIG. 5, a 25-pixel region of 5 pixels×5 pixels is used as a determination block 60. The determination block 60 may have any size as long as it includes the pixel to be corrected and a plurality of imaging pixels which are adjacent to the pixel to be corrected and detect the same color as the pixel to be corrected.

In the next Step S2, the image processing unit 173 sets a variable i to 1. Then, in Step S3, the image processing unit 173 determines whether the edge of the object image is present in an i-th block. The position of the edge of the image can be detected by a known method.

For example, when a difference in brightness between adjacent imaging pixels in a portion is equal to or greater than a threshold value, the portion can be detected as an edge where the brightness of the image changes critically and is discontinuous.

When it is determined in Step S3 that an edge is not present in the i-th block, the image processing unit 173 proceeds to Step S4. The image processing unit 173 performs the gain correction on the output signal from the pixel to be corrected which is located at the center of the i-th block using the gain correction processing unit 171.

When an edge is present in the block, the difference in brightness between two regions which cross the edge is large. However, when an edge is not present in the block, the pixel to be corrected (phase difference detecting pixel) and the neighboring imaging pixels receive light with the same brightness. Therefore, it is possible to perform correction with high accuracy by multiplying the amount of light received by the pixel to be corrected by a predetermined gain.

When it is determined in Step S3 that an edge is present in the i-th block, the image processing unit 173 proceeds to Step S5. The image processing unit 173 determines the direction of the edge. In this embodiment, the image processing unit 173 determines one of two directions as the direction of the edge or determines one of the two directions close to the direction of edge.

In the phase difference detecting pixel pair illustrated in FIGS. 2A to 2C, one opening 52a of the light shielding film and the other opening 52b of the light shielding film are provided so as to lean to one side in the left-right direction such that the phase difference in the horizontal direction (left-right direction) can be separately detected.

Therefore, two directions, that is, a direction (left-right direction) in which the phase difference is separated and a direction (up-down direction) perpendicular to the direction are set and it is determined whether the direction of the edge is closer to the left-right direction (X direction) or the up-down direction (Y direction) on the basis of the 45-degree direction.

When it is determined in Step S5 that the direction of the edge is closer to the same direction as the horizontal direction (the direction in which the phase difference is detected), the image processing unit 173 proceeds to Step S4. The image processing unit 173 performs the gain correction on the output signal from the phase difference detecting pixel which is located at the center of the i-th block using the gain correction processing unit 171.

Figure 7:
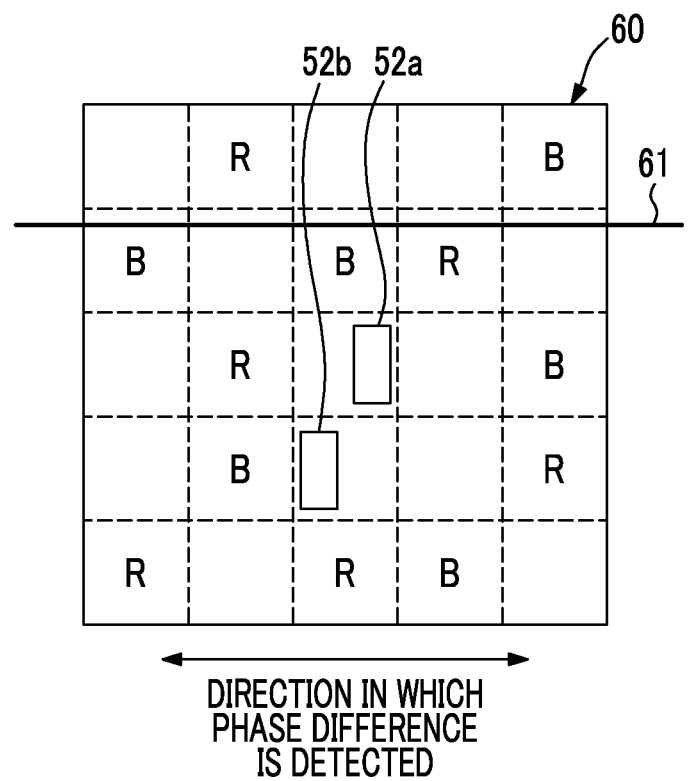
FIG. 7 is a diagram illustrating a case in which gain correction is performed.

FIG. 7 is a diagram illustrating a case in which the gain correction is performed. In the example illustrated in FIG. 7, there is a phase difference detecting pixel pair (two pixels) in the block 60. In FIG. 7, there is an edge 61 in the block 60. In addition, the edge 61 is separated from the phase difference detecting pixels and the direction of the edge 61 is the same as the direction in which the phase difference is detected (in this embodiment, the left-right direction (horizontal direction)).

A difference in brightness between two regions divided by the edge 61 in the block 60 is very large. However, a change in brightness in the same region is small. Therefore, the output signal from the pixel to be corrected is different from the output signal from the imaging pixel, which is adjacent to the pixel to be corrected, is arranged on the same side (region) as the pixel to be corrected with respect to the edge 61, and has the same color as the pixel to be corrected, by a difference in the amount of opening of the light shielding film between the two pixels. Therefore, in this case, gain correction which multiplies a signal value by a gain value corresponding to the difference in the amount of opening of the light shielding film can be performed to reduce the difference between the signal value at the position of the pixel to be corrected and the signal value at the position of the imaging pixel in the vicinity of the pixel to be corrected.

Figure 8:
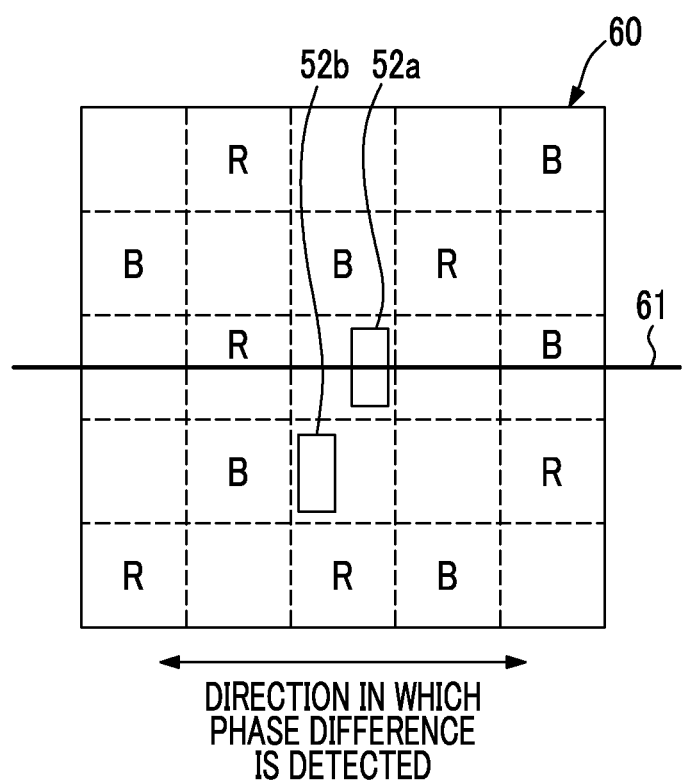
FIG. 8 is a diagram illustrating a case in which an edge overlaps a pixel to be corrected.

FIG. 8 illustrates a case in which the edge 61 overlaps the pixel to be corrected. In this case, light corresponding to two regions which cross the edge 61 is incident on the opening 52a of the light shielding film in the pixel to be corrected. In addition, light corresponding to two regions which cross the edge 61 is incident on the imaging pixel which is adjacent to the pixel to be corrected in the horizontal direction and has the same color as the pixel to be corrected.

That is, the value of the output signal from the pixel to be corrected and the value of the output signal from the imaging pixel which is adjacent to the pixel to be corrected in the horizontal direction and has the same color as the pixel to be corrected are reduced so as to be equal to each other by the edge 61.

For example, it is assumed that the value of the output signal from the imaging pixel which is adjacent to the pixel to be corrected in the horizontal direction and has the same color as the pixel to be corrected is "20". When the amount of opening of the light shielding film in the pixel to be corrected is half of the amount of opening of the light shielding film in the imaging pixel, the value of the output signal from the pixel to be corrected is "20×1/2=10". Therefore, when gain correction which multiplies an output signal from a pixel 52 to be corrected by a gain value (=2) corresponding to the difference in the amount of opening of the light shielding film is performed, it is possible to obtain substantially the same signal value from the pixel to be corrected and the imaging pixel which is adjacent to the pixel to be corrected and has the same color as the pixel to be corrected.

In the cases illustrated in FIGS. 7 and 8, even when the output signal from the pixel to be corrected is corrected by the interpolation correction, it is possible to obtain substantially the same signal value from the pixel to be corrected and the imaging pixel which is adjacent to the pixel to be corrected and has the same color as the pixel to be corrected.

That is, in Step S4, the image processing unit 173 may perform correction, using not the gain correction process but the interpolation correction process. One of the correction processes to be performed may be predetermined in advance. Alternatively, a scene in the block may be determined by another method and a correction method which can obtain higher accuracy for the scene may be selected.

When it is determined in Step S5 that the direction of the edge is the up-down direction (a direction perpendicular to the direction in which the phase difference is detected), the image processing unit 173 proceeds to Step S6. The image processing unit 173 performs interpolation correction on the output signal from the pixel to be corrected using the interpolation correction processing unit 172.

Figure 9:
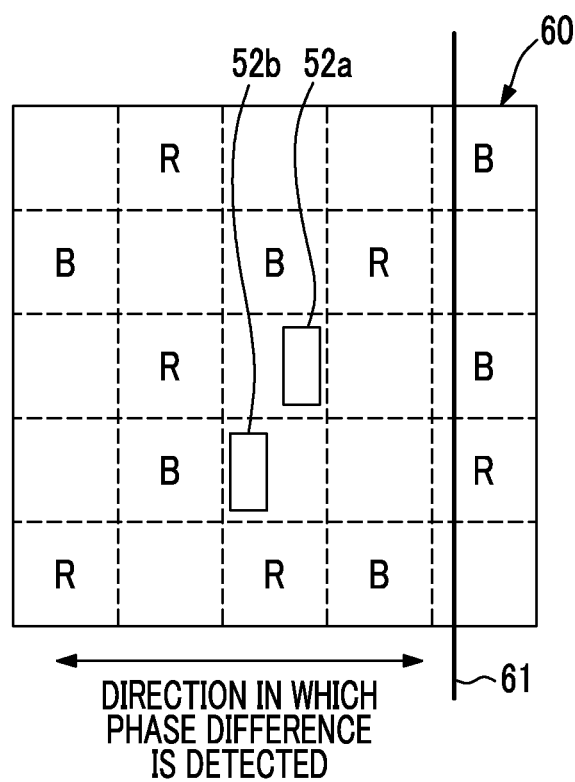
FIG. 9 is a diagram illustrating a case in which interpolation correction is performed.

FIG. 9 is a diagram illustrating a case in which the direction of the edge is the up-down direction. An edge 61 which is perpendicular to the direction in which the phase difference is detected is present in the block 60. In the example illustrated in FIG. 9, the edge 61 is separated from the pixel 52 to be corrected. A difference in brightness between two regions divided by the edge 61 is very large, but the brightness of the same region can be considered to be substantially uniform.

In the example illustrated in FIG. 9, similarly to the case illustrated in FIG. 7, when the gain correction is performed on the value of the output signal from the pixel 52 to be corrected, it is possible to calculate the corrected signal value of the pixel 52 to be corrected with high accuracy. However, when the direction of the edge is the up-down direction, there is a case illustrated in FIG. 10.

Figure 10:
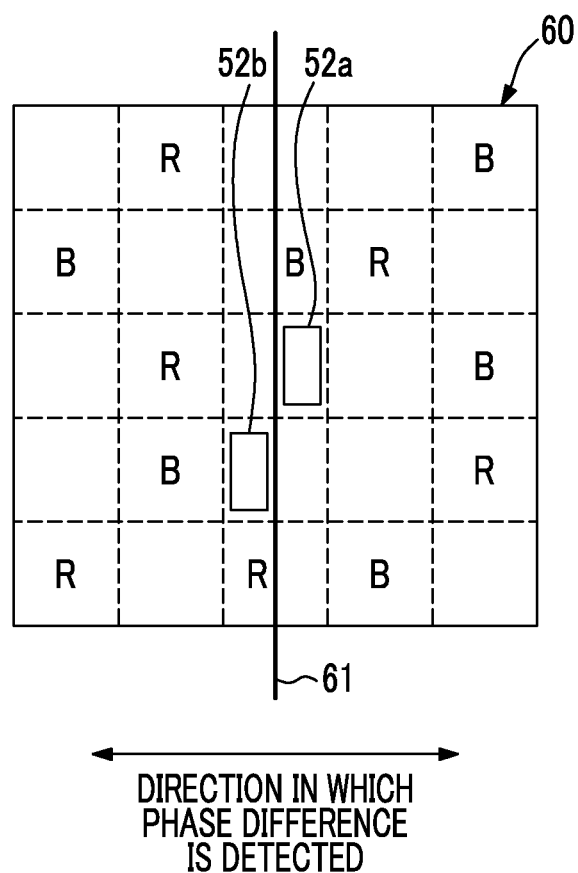
FIG. 10 is a diagram illustrating a case in which the edge overlaps the pixel to be corrected.

FIG. 10 is a diagram illustrating a case in which the direction of the edge is the up-down direction. An edge 61 which is perpendicular to the direction in which the phase difference is detected is present in the block 60. In the example illustrated in FIG. 10, it is assumed that the edge 61 overlaps the pixel 52 to be corrected, the right side of the edge 61 is bright, and the left side thereof is dark.

In this case, light is incident on half of the opening of the light shielding film in an imaging pixel which is closest to the pixel to be corrected in the upward direction and has the same color as the pixel to be corrected. In contrast, light is incident on the entire opening of the light shielding film in the pixel to be corrected. That is, there is no difference in sensitivity between the pixel to be corrected and the imaging pixel which is adjacent to the pixel to be corrected and has the same color as the pixel to be corrected.

Therefore, in this state, when the output signal from the pixel to be corrected is multiplied by a gain value corresponding to a difference in the amount of opening of the light shielding film, the value of the output signal from the pixel to be corrected is greater than the value of the output signal from the imaging pixel which is closest to the pixel to be corrected and has the same color as the pixel to be corrected and the accuracy of the gain correction is reduced.

When the direction of the edge is the up-down direction, the image processing unit 173 does not perform the gain correction, but performs the interpolation correction to correct the output signal from the pixel to be corrected in Step S6, assuming the case illustrated in FIG. 10.

In the interpolation correction in Step S6, the output signal from the pixel to be corrected may be calculated by interpolation calculation using an output signal from an imaging pixel which is adjacent to the pixel to be corrected in a direction perpendicular to the direction in which the phase difference is detected and has the same color as the pixel to be corrected and an output signal from an imaging pixel which is adjacent to the pixel to be corrected in the direction in which the phase difference is detected may not be used. In this case, it is possible to further improve the accuracy of correction.

The image processing unit 173 proceeds to Step S7 after the process from Step S4 or Step S6 and determines whether i=n is established. That is, the image processing unit 173 determines whether the process from Step S3 to Step S6 has been performed for all of the determination blocks. When the process has been performed for all of the determination blocks, the image processing unit 173 ends the process. When the process has not been performed for all of the determination blocks, the image processing unit 173 proceeds to Step S8, increases the value of i by 1 (i=i+1), and returns to Step S3.

The image processing unit 173 processes the corrected value of the output signal from the phase difference detecting pixel and the value of the output signal from the imaging pixel to generate the captured image data. In this way, it is possible to obtain a high-quality image.

Since the solid-state imaging element 5 according to this embodiment uses a solid-state imaging element without an optical low-pass filter, the edge 61 is very sharp and there is a concern that the edge 61 will divide the phase difference detecting pixel pair in the left-right direction, as illustrated in FIG. 10. Therefore, in this case, when the gain correction is performed, one of the phase difference detecting pixels which are adjacent to each other in the up-down direction is bright and the other phase difference detecting pixel is dark. As a result, image quality deteriorates significantly. However, since the interpolation correction using the value of the output signal from the imaging pixel arranged in the extension direction of the edge 61 is performed, it is possible to improve image quality.

The above-described embodiment can be applied to a solid-state imaging element in which an optical low-pass filter is provided on the front surface of the solid-state imaging element 5. In this case, since the edge 61 is a little blurred by the function of the optical low-pass filter, the accuracy of dividing the phase difference detecting pixel pair in the left-right direction is reduced and the values of the output signals from the phase difference detecting pixel pair are close to each other. Therefore, even when the gain correction is performed, the deterioration of image quality is less than that when the low-pass filter is not provided. However, it is preferable to perform the interpolation correction.

In the description of FIG. 6, when the direction of the edge 61 is perpendicular to the direction in which the phase difference is detected, the interpolation correction is performed in Step S6. However, the interpolation correction in Step S6 may be performed only when the direction of the edge 61 is perpendicular to the direction in which the phase difference is detected and the edge overlaps the phase difference detecting pixel.

Figure 11:
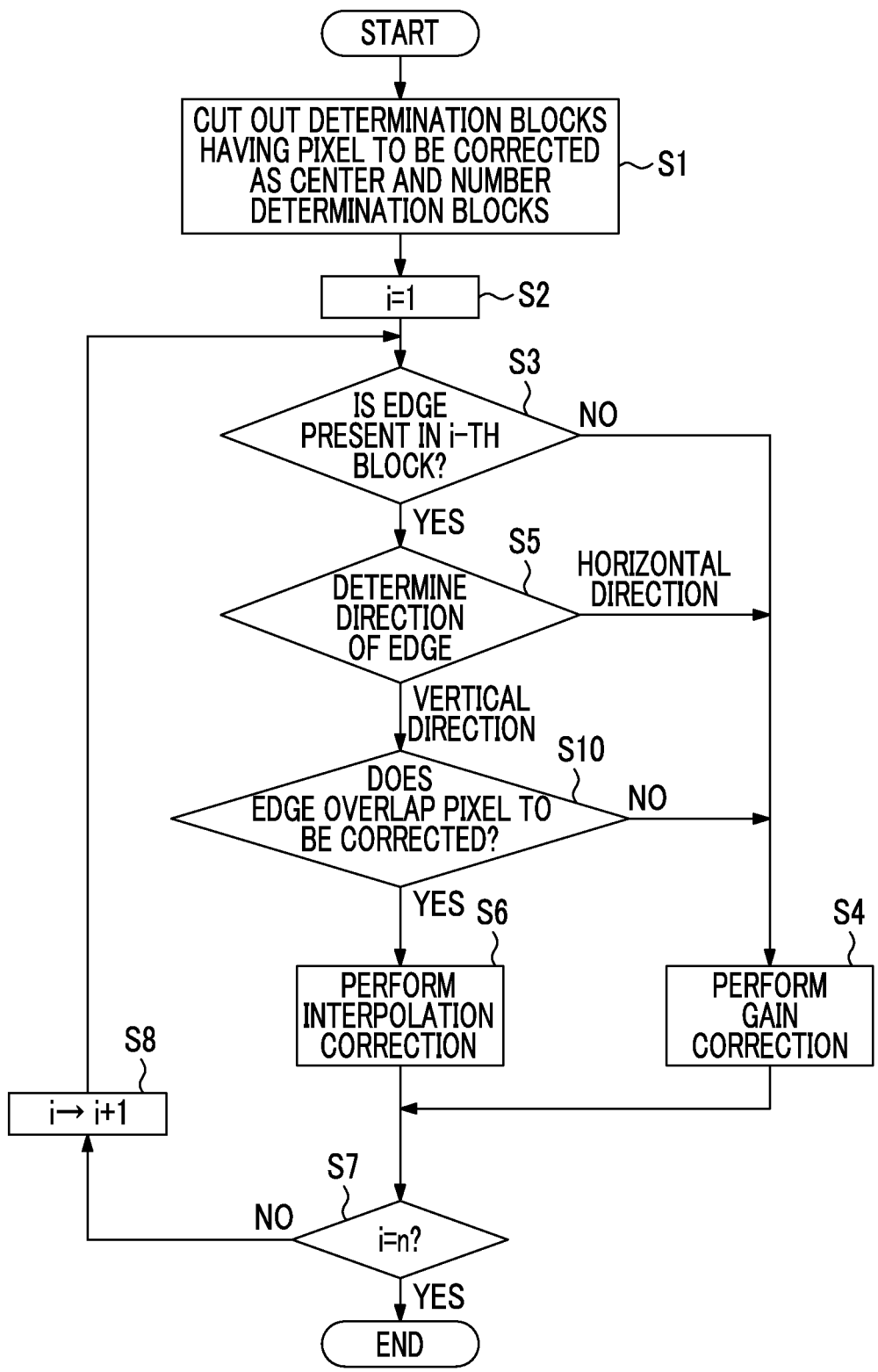
FIG. 11 is a diagram illustrating a modification example of the flowchart illustrated in FIG. 6.

FIG. 11 is a diagram illustrating a modification example of the flowchart illustrated in FIG. 6. In FIG. 11, Step S10 is added between Step S5 and Step S6 illustrated in FIG. 6. When it is determined in Step S5 that the direction of the edge is the vertical direction, the image processing unit 173 determines whether the edge overlaps the pixel to be corrected in Step S10. When the edge overlaps the pixel to be corrected as illustrated in FIG. 10, the image processing unit 173 performs the process in Step S6. When the edge does not overlap the pixel to be corrected as illustrated in FIG. 9, the image processing unit 173 performs the process in Step S4. In this way, it is possible to improve the accuracy of correction in a case in which the edge does not overlap the pixel to be corrected.

In Step S6 illustrated in FIGS. 6 and 11, the value of the output signal from the phase difference detecting pixel is replaced with the average value of the output signals from the imaging pixels to perform the interpolation correction. However, the invention is not limited to the replacement with the average value. For example, interpolation correction may be performed which replaces the output signal from the pixel to be corrected with a signal generated by the imaging pixel that is arranged in the vicinity of the pixel to be corrected and detects the same color as the pixel to be corrected. For example, the following correction may be performed: an output signal from an imaging pixel which is closest to the phase difference detecting pixel in the direction of the edge and has the same color as the phase difference detecting pixel is duplicated and the output signal from the pixel to be corrected is replaced with the duplicate output signal.

A specific embodiment of the invention has been described above. However, the invention is not limited to the above-described embodiment and various modifications and changes of the invention can be made without departing from the disclosed technical spirit of the invention.

For example, the pixel array of the solid-state imaging element 5 including the phase difference detecting pixels and the imaging pixels is not limited to those illustrated in FIGS. 2A to 2C and FIGS. 3A to 3C and other known arrays (for example, a Bayer array) can be used. In addition, the solid-state imaging element 5 may be a monochromatic solid-state imaging element. That is, a color filter may be omitted.

Figure 12:
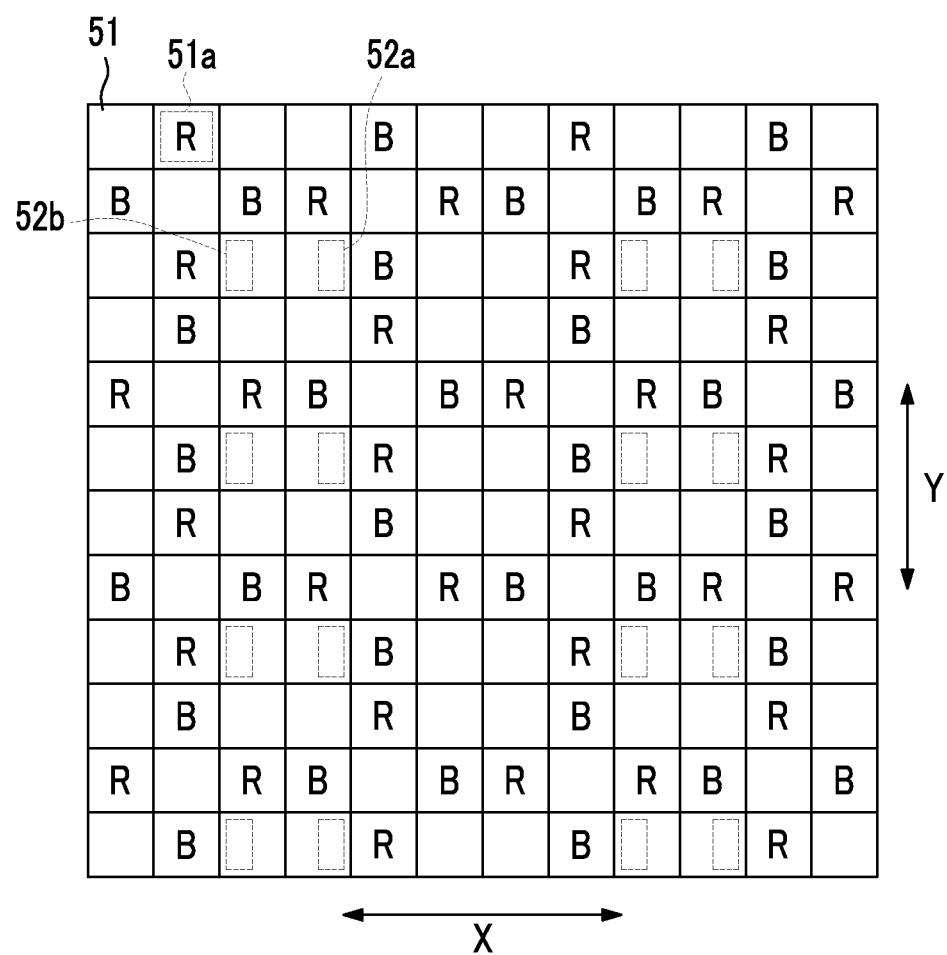
FIG. 12 is a diagram illustrating a modification example of the arrangement of a phase difference detecting pixel pair.
Figure 13:
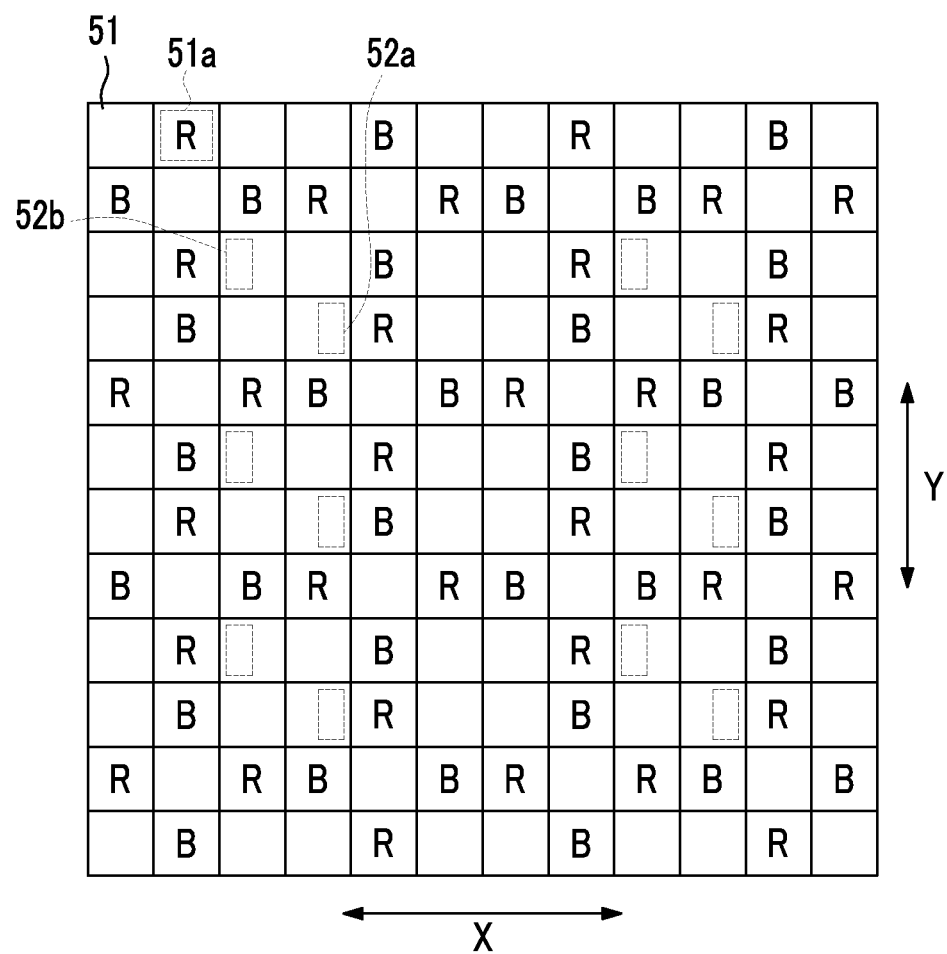
FIG. 13 is a diagram illustrating a modification example of the arrangement of the phase difference detecting pixel pair.

In FIGS. 2A to 2C, the phase difference detecting pixel pair is formed by two pixels which are adjacent to each other in the up-down (vertical) direction. However, as illustrated in FIG. 12, the phase difference detecting pixel pair may be formed by two pixels which are adjacent to each other in the left-right (horizontal) direction. In addition, as illustrated in FIG. 13, the phase difference detecting pixel pair may be formed by two pixels which are adjacent to each other in an oblique direction. Alternatively, two pixels which form the phase difference detecting pixel pair may not be adjacent to each other and may be separated from each other by about several pixels. In addition, the example in which the phase difference detecting pixel is a G pixel has been described. However, the phase difference detecting pixel may be an R pixel or a B pixel. The openings 52a and 52b of the light shielding film do not necessarily have a rectangular shape.

The steps illustrated in FIGS. 6 and 11 which are performed by the digital signal processing unit 17 may be provided as a program which causes a computer to perform the steps. The program may be recorded on a non-transitory recording medium from which the computer can read the program.

Examples of the "computer-readable recording medium" include an optical medium, such as a compact disc-ROM (CD-ROM), and a magnetic recording medium, such as a memory card. The program can also be downloaded through a network and then provided.

The digital camera has been described above. However, the structure of the image capture device is not limited thereto. For example, other image capture devices according to the invention include a built-in or external camera for a PC and a portable terminal device which has an imaging function, which will be described below.

Examples of the portable terminal device which is an embodiment of the image capture device according to the invention include a mobile phone, a smart phone, a personal digital assistant (PDA), and a portable game machine. Hereinafter, the smart phone will be described in detail as an example with reference to the drawings.

Figure 14:
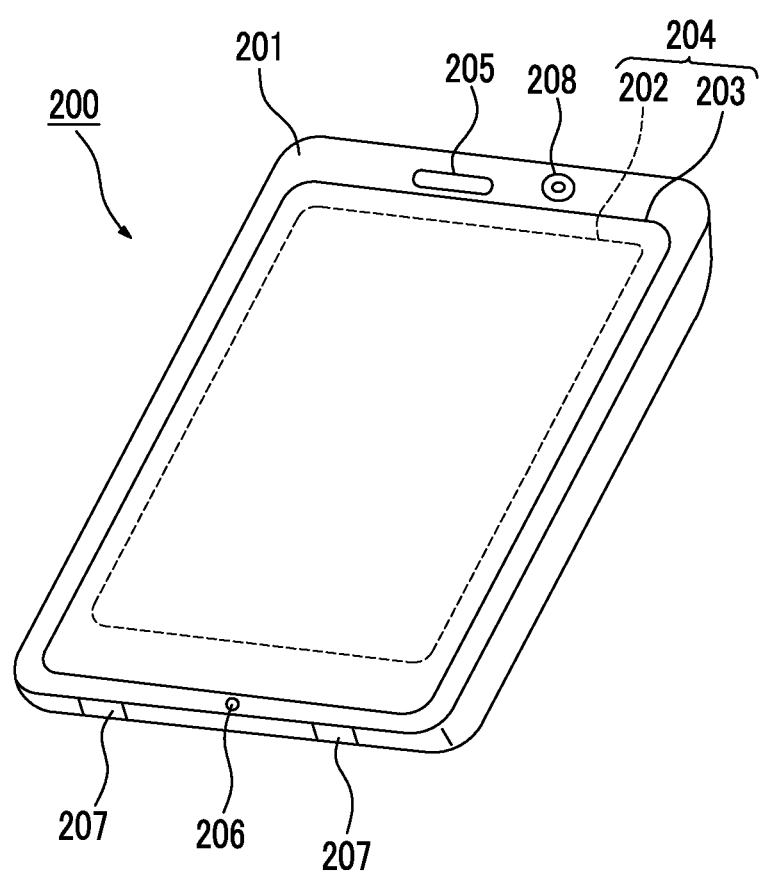
FIG. 14 is a diagram illustrating the outward appearance of an image capture device (smart phone) according to another embodiment of the invention.

FIG. 14 illustrates the outer appearance of a smart phone 200 which is an embodiment of the image capture device according to the invention. The smart phone 200 illustrated in FIG. 14 includes a housing 201 with a flat panel shape and a display input unit 204 having a display panel 202 as a display unit and an operation panel 203 as an input unit which are integrally formed on one surface of the housing 201. The housing 201 includes a speaker 205, a microphone 206, an operating unit 207, and a camera unit 208. However, the configuration of the housing 201 is not limited thereto. For example, the display unit and the input unit may be independently provided, or the housing 201 may have a folding structure or a sliding mechanism.

Figure 15:
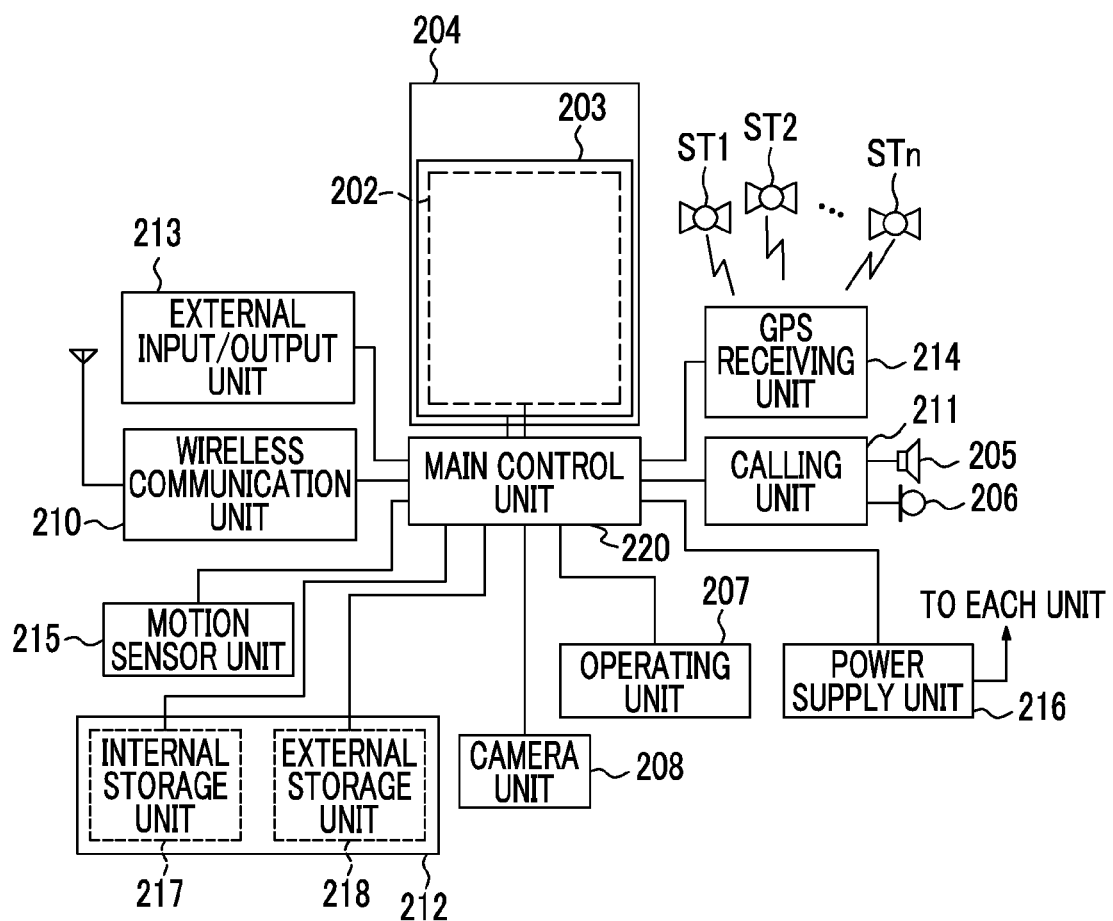
FIG. 15 is a functional block diagram illustrating the image capture device illustrated in FIG. 14.

FIG. 15 is a block diagram illustrating the structure of the smart phone 200 illustrated in FIG. 14. As illustrated in FIG. 15, the smart phone includes, as main components, a wireless communication unit 210, the display input unit 204, a calling unit 211, the operating unit 207, the camera unit 208, a storage unit 212, an external input/output unit 213, a global positioning system (GPS) receiving unit 214, a motion sensor unit 215, a power supply unit 216, and a main control unit 220. The smart phone 200 has, as a main function, a wireless communication function which performs mobile wireless communication through a base station apparatus BS (not illustrated) and a mobile communication network NW (not illustrated).

The wireless communication unit 210 performs wireless communication with the base station apparatus BS which is accommodated in the mobile communication network NW in response to an instruction from the main control unit 220. The wireless communication is used to transmit and receive various types of file data, such as voice data and image data, and electronic mail data or to receive, for example, web data and streaming data.

The display input unit 204 is a so-called touch panel which displays an image (a still image or a moving image) or text information to visually transmit information to the user and detects the user's operation for the displayed information under the control of the main control unit 220, and includes the display panel 202 and the operation panel 203.

The display panel 202 uses, for example, a liquid crystal display (LCD) or an organic electro-luminescence display (OELD) as a display device. The operation panel 203 is a device that is provided such that an image displayed on a display surface of the display panel 202 is visually recognized and detects the coordinates of one or a plurality of positions operated by the finger of the user or a stylus. When the device is operated by the finger of the user or the stylus, a detection signal which is generated by the operation is output to the main control unit 220. Then, the main control unit 220 detects an operation position (coordinates) on the display panel 202 on the basis of the received detection signal.

As illustrated in FIG. 14, the display panel 202 and the operation panel 203 of the smart phone 200, which is an embodiment of the image capture device according to the invention, are integrated to form the display input unit 204 and the operation panel 203 is arranged so as to completely cover the display panel 202. When this arrangement is used, the operation panel 203 may have a function of detecting the user's operation in a region other than the display panel 202. In other words, the operation panel 203 may include a detection region (hereinafter, referred to as a "display region") for an overlap portion which overlaps the display panel 202 and a detection region (hereinafter, referred to as a "non-display region") for an outer edge portion which does not overlap the display panel 202.

The size of the display region may be exactly equal to the size of the display panel 202. However, the sizes are not necessarily equal to each other. The operation panel 203 may include two sensitive regions, that is, an outer edge portion and an inner portion other than the outer edge portion. The width of the outer edge portion is appropriately designed according to the size of the housing 201. Examples of a position detecting method which is used in the operation panel 203 include a matrix switching method, a resistive layer method, a surface elastic wave method, an infrared method, an electromagnetic induction method, and a capacitive sensing method. Any method may be used.

The calling unit 211 includes the speaker 205 and the microphone 206. The calling unit 211 converts the voice of the user which is input through the microphone 206 into voice data which can be processed by the main control unit 220 and outputs the converted voice data to the main control unit 220. In addition, the calling unit 211 decodes voice data received by the wireless communication unit 210 or the external input/output unit 213 and outputs the decoded voice data from the speaker 205. As illustrated in FIG. 14, for example, the speaker 205 can be mounted on the same surface as the display input unit 204 and the microphone 206 can be mounted on a side surface of the housing 201.

The operating unit 207 is a hardware key which uses, for example, a key switch and receives instructions from the user. For example, as illustrated in FIG. 14, the operating unit 207 is a push button switch which is mounted on the side surface of the housing 201 of the smart phone 200, is turned on when it is pressed by, for example, a finger, and is turned off by the restoring force of a spring when the finger is taken off.

The storage unit 212 stores a control program or control data of the main control unit 220, application software, address data which is associated with, for example, the names or phone numbers of communication partners, transmitted and received electronic mail data, web data which is downloaded by web browsing, or downloaded content data. In addition, the storage unit 212 temporarily stores, for example, streaming data. The storage unit 212 includes an internal storage unit 217 which is provided in the smart phone and an external storage unit 218 which has a detachable external memory slot. The internal storage unit 217 and the external storage unit 218 forming the storage unit 212 may be implemented by a storage medium, such as a flash memory, a hard disk, a multimedia-card-micro-type memory, a card-type memory (for example, a Micro SD (registered trademark) memory), a random access memory (RAM), or a read only memory (ROM).

The external input/output unit 213 functions as an interface with all external apparatuses which are connected to the smart phone 200 and is directly or indirectly connected to other external apparatuses by communication (for example, a universal serial bus (USB) or IEEE1394) or a network (for example, the Internet, a wireless LAN, a Bluetooth (registered trademark) network, a radio frequency identification (RFID) network, an infrared data association (IrDA (registered trademark)) network, an ultra wideband (UWB: registered trademark) network, or a ZigBee (registered trademark) network).

Examples of the external apparatus connected to the smart phone 200 include a wired/wireless headset, a wired/wireless external charger, a wired/wireless data port, a memory card or a subscriber identity module (SIM) card/user identity module (UIM) card which is connected through a card socket, an external audio/video apparatus which is connected through an audio/video input/output (I/O) terminal, a wirelessly connected external audio/video apparatus, a smart phone which is connected wirelessly or in a wired manner, a personal computer which is connected wirelessly or in a wired manner, a PDA which is connected wirelessly or in a wired manner, and an earphone. The external input/output unit 213 can transmit data which is received from the external apparatus to each component of the smart phone 200 and can transmit data in the smart phone 200 to the external apparatus.

The GPS receiving unit 214 receives GPS signals transmitted from GPS satellites ST1 to STn and performs a position measurement process on the basis of the received GPS signals to detect a position including the latitude, longitude, and height of the smart phone 200, in response to an instruction from the main control unit 220. When the GPS receiving unit 214 can acquire positional information from the wireless communication unit 210 or the external input/output unit 213 (for example, the wireless LAN), it can detect the position using the positional information.

The motion sensor unit 215 includes, for example, a triaxial acceleration sensor and detects the physical movement of the smart phone 200 in response to an instruction from the main control unit 220. When the physical movement of the smart phone 200 is detected, the moving direction or acceleration of the smart phone 200 is detected. The detection result is output to the main control unit 220.

The power supply unit 216 supplies power which is stored in a battery (not illustrated) to each unit of the smart phone 200 in response to an instruction from the main control unit 220.

The main control unit 220 includes a microprocessor, operates on the basis of the control program or control data stored in the storage unit 212, and controls the overall operation of each unit of the smart phone 200. The main control unit 220 has an application processing function and a mobile communication control function of controlling each unit of a communication system in order to perform voice communication or data communication through the wireless communication unit 210. When the digital signal processing unit 17 described with reference to FIG. 1 is provided in the main control unit 220, it is possible to perform the process described with reference to FIG. 6.

The application processing function is implemented by the operation of the main control unit 220 based on the application software which is stored in the storage unit 212. Examples of the application processing function include an infrared communication function which controls the external input/output unit 213 such that data communication with an opposing apparatus is performed, an electronic mail function which transmits and receives electronic mail, and a web browsing function which allows the browsing of web pages.

The main control unit 220 has, for example, an image processing function which displays an image on the display input unit 204 on the basis of image data (still image or moving image data) such as received data or downloaded streaming data. The image processing function means the function of the main control unit 220 decoding the image data, performing image processing on the decoding result, and displaying the image on the display input unit 204.

The main control unit 220 performs display control for the display panel 202 and operation detection control which detects the operation of the user through the operating unit 207 and the operation panel 203. The main control unit 220 performs the display control to display a software key, such as an icon for starting application software or a scroll bar, or to display a window for creating electronic mail. Here, the scroll bar means a software key for receiving an instruction to move a displayed portion of an image that is too large to fit into the display region of the display panel 202.

The main control unit 220 performs the operation detection control to detect the operation of the user input through the operating unit 207 or to receive an operation for the icon, the input of a character string to an input field of the window through the operation panel 203, or a request to scroll the displayed image through the scroll bar.

In addition, the main control unit 220 performs the operation detection control to determine whether the position of an operation for the operation panel 203 is an overlap portion (display region) which overlaps the display panel 202 or an outer edge portion (non-display region) which does not overlap the display panel 202 other than the overlap portion. The main control unit 220 has a touch panel control function that controls a sensitive region of the operation panel 203 or the display position of the software key.

The main control unit 220 can detect a gesture operation for the operation panel 203 and can perform a predetermined function according to the detected gesture operation. The gesture operation does not mean a simple touch operation of the related art, but means an operation which draws a trace using a finger, an operation which designates a plurality of positions at the same time, or an operation which draws a trace for at least one of the plurality of positions using a combination of the above-mentioned operations.

The camera unit 208 is a digital camera which electronically captures an image using a solid-state imaging element, such as a complementary metal oxide semiconductor (CMOS) device or a charge-coupled device (CCD). It is preferable that the solid-state imaging element does not include an optical low-pass filter. In addition, the optical low-pass filter may be attached to the front surface of the solid-state imaging element. The camera unit 208 converts captured image data into image data which is compressed in, for example, a joint photographic coding experts group (JPEG) format under the control of the main control unit 220 and records the converted image data in the storage unit 212 or outputs the converted image data through the external input/output unit 213 or the wireless communication unit 210. As illustrated in FIG. 14, the camera unit 208 is mounted on the same surface as the display input unit 204 in the smart phone 200. However, the mounting position of the camera unit 208 is not limited thereto. For example, the camera unit 208 may be mounted on the rear surface of the display input unit 204 or a plurality of camera units 208 may be mounted. When the plurality of camera units 208 are mounted, the camera units 208 which are used to capture images may be switched such that a single camera unit captures images or the plurality of camera units 208 may be simultaneously used to capture images.

The camera unit 208 can be used for various functions of the smart phone 200. For example, the image captured by the camera unit 208 can be displayed on the display panel 202 or the image captured by the camera unit 208 can be used as one of the operation inputs of the operation panel 203. When the GPS receiving unit 214 detects the position, the position may be detected with reference to the image from the camera unit 208. In addition, the optical axis direction of the camera unit 208 in the smart phone 200 may be determined or the current usage environment may be determined, with reference to the image from the camera unit 208, using the triaxial acceleration sensor or without using the triaxial acceleration sensor. Of course, the image from the camera unit 208 may be used in the application software.

For example, the positional information which is acquired by the GPS receiving unit 214, the voice information which is acquired by the microphone 206 (which may be text information which is converted from the voice information by, for example, the main control unit), or the posture information which is acquired by the motion sensor unit 215 may be added to the image data of a still image or a moving image and the image data may be stored in the storage unit 212 or may be output through the external input/output unit 213 or the wireless communication unit 210.

In the above-described embodiment, the digital camera including, for example, the smart phone corrects the value of the output signal of the phase difference detecting pixel and generates a high-quality object image. However, the above-described embodiment can also be applied to a case in which the digital camera outputs the output signal from the solid-state imaging element 5 as RAW data and, for example, a computer corrects the acquired RAW data to generate an object image.

In this case, for example, the computer needs to know the position of the phase difference detecting pixel in the solid-state imaging element 5. Therefore, preferably, data for the position is added to the RAW data and the RAW data is output to, for example, the computer. As described above, in the structure in which the digital camera outputs, as RAW data, the captured image signal in which the value of the output signal from the phase difference detecting pixel has been corrected, data for the position of the phase difference detecting pixel in the solid-state imaging element is not needed.

As described above, the specification discloses the following matters.

A disclosed image processing device processes a captured image signal that is output from a solid-state imaging element including a plurality of imaging pixels and a plurality of phase difference detecting pixels which are arranged in a two-dimensional array on a light receiving surface. The image processing device includes: a gain correction processing unit that performs a gain correction process of multiplying an output signal from the phase difference detecting pixel, which is included in the captured image signal, by a gain value to correct the output signal; an interpolation correction processing unit that performs an interpolation correction process of replacing the output signal from the phase difference detecting pixel, which is included in the captured image signal, with a signal that is generated using an output signal from the imaging pixel, which is arranged in the vicinity of the phase difference detecting pixel and detects the same color as the phase difference detecting pixel, to correct the output signal from the phase difference detecting pixel; and a correction unit that corrects each of the output signals from the plurality of phase difference detecting pixels, which are included in the captured image signal, using the gain correction processing unit or the interpolation correction processing unit. The correction unit corrects the output signal from the phase difference detecting pixel to be corrected, using the interpolation correction processing unit, in a first case in which an edge of an object image that extends in a direction perpendicular to a direction in which a phase difference is detected by the phase difference detecting pixel is present in a determination area including the phase difference detecting pixel to be corrected and the plurality of imaging pixels which are arranged in the vicinity of the phase difference detecting pixel to be corrected and detect the same color as the phase difference detecting pixel to be corrected or a second case in which the edge of the object image that extends in the direction perpendicular to the direction in which the phase difference is detected is present in the determination area and overlaps the phase difference detecting pixel to be corrected.

In the disclosed image processing device, in the first case or the second case, the interpolation correction processing unit corrects the output signal from the phase difference detecting pixel to be corrected, using the output signal from the imaging pixel which is arranged in a direction perpendicular to the phase difference detecting pixel to be corrected and detects the same color as the phase difference detecting pixel.

In the disclosed image processing device, the solid-state imaging element does not include an optical low-pass filter.

In the disclosed image processing device, the solid-state imaging element includes color filters that are provided on a plurality of pixels arranged in the two-dimensional array. The array of the color filters includes an array pattern of a 3×3 pixel group in which first filters corresponding to a first color that most contributes to obtaining a brightness signal and second filters corresponding to two or more second colors other than the first color are arranged. The first filters are arranged at a center and four corners in the 3×3 pixel group. The array pattern is repeatedly arranged in a horizontal direction and a vertical direction. The proportion of the number of pixels of the first color corresponding to the first filters is higher than the proportion of the number of pixels of the second colors corresponding to the second filters. The phase difference detecting pixel is provided in the pixel on which the first filter is provided.

A disclosed image capture device includes the image processing device and the solid-state imaging element.

A disclosed image processing method processes a captured image signal output from a solid-state imaging element including a plurality of imaging pixels and a plurality of phase difference detecting pixels which are arranged in a two-dimensional array on a light receiving surface. The image processing method includes a correction step of correcting each of output signals from the plurality of phase difference detecting pixels, which are included in the captured image signal, using a gain correction process of multiplying the output signal by a gain value to correct the output signal or an interpolation correction process of replacing the output signal from the phase difference detecting pixel with a signal that is generated using an output signal from the imaging pixel, which is arranged in the vicinity of the phase difference detecting pixel and detects the same color as the phase difference detecting pixel, to correct the output signal. In the correction step, the output signal from the phase difference detecting pixel to be corrected is corrected using the interpolation correction process, in a first case in which an edge of an object image that extends in a direction perpendicular to a direction in which a phase difference is detected by the phase difference detecting pixel is present in a determination area including the phase difference detecting pixel to be corrected and the plurality of imaging pixels which are arranged in the vicinity of the phase difference detecting pixel to be corrected and detect the same color as the phase difference detecting pixel to be corrected or a second case in which the edge of the object image that extends in the direction perpendicular to the direction in which the phase difference is detected is present in the determination area and overlaps the phase difference detecting pixel to be corrected.

A disclosed image processing program causes a computer to process a captured image signal output from a solid-state imaging element including a plurality of imaging pixels and a plurality of phase difference detecting pixels which are arranged in a two-dimensional array on a light receiving surface. The image processing program causes the computer to perform a correction step of correcting each of output signals from the plurality of phase difference detecting pixels, which are included in the captured image signal, using a gain correction process of multiplying the output signal by a gain value to correct the output signal or an interpolation correction process of replacing the output signal from the phase difference detecting pixel with a signal that is generated using an output signal from the imaging pixel, which is arranged in the vicinity of the phase difference detecting pixel and detects the same color as the phase difference detecting pixel, to correct the output signal. In the correction step, the output signal from the phase difference detecting pixel to be corrected is corrected using the interpolation correction process, in a first case in which an edge of an object image that extends in a direction perpendicular to a direction in which a phase difference is detected by the phase difference detecting pixel is present in a determination area including the phase difference detecting pixel to be corrected and the plurality of imaging pixels which are arranged in the vicinity of the phase difference detecting pixel to be corrected and detect the same color as the phase difference detecting pixel to be corrected or a second case in which the edge of the object image that extends in the direction perpendicular to the direction in which the phase difference is detected is present in the determination area and overlaps the phase difference detecting pixel to be corrected.

The image processing method according to the invention can appropriately switch correction for the output signal from the phase difference detecting pixel between gain correction and correction other than the gain correction according to a captured scene. Therefore, the image processing method can generate a high-quality object image and is useful when it is applied to, for example, a digital camera.

What is claimed is:

1. An image processing device that processes a captured image signal output from a solid-state imaging element including a plurality of imaging pixels and a plurality of phase difference detecting pixels which are arranged in a two-dimensional array on a light receiving surface, comprising:

a gain correction processing unit that performs a gain correction process of multiplying an output signal from the phase difference detecting pixel, which is included in the captured image signal, by a gain value to correct the output signal; an interpolation correction processing unit that performs an interpolation correction process of replacing the output signal from the phase difference detecting pixel, which is included in the captured image signal, with a signal that is generated using an output signal from the imaging pixel, which is arranged in the vicinity of the phase difference detecting pixel and detects a color which is the same color as the phase difference detecting pixel, to correct the output signal from the phase difference detecting pixel; and a correction unit that corrects each of the output signals from the plurality of phase difference detecting pixels, which are included in the captured image signal, using the gain correction processing unit or the interpolation correction processing unit, wherein the correction unit corrects the output signal from the phase difference detecting pixel to be corrected, using the interpolation correction processing unit, in a first case in which an edge of an object image that extends in a direction perpendicular to a direction in which a phase difference is detected by the phase difference detecting pixel is present in a determination area including the phase difference detecting pixel to be corrected and the plurality of imaging pixels which are arranged in the vicinity of the phase difference detecting pixel to be corrected and detect the same color as the phase difference detecting pixel to be corrected or a second case in which the edge of the object image that extends in the direction perpendicular to the direction in which the phase difference is detected is present in the determination area and overlaps the phase difference detecting pixel to be corrected.

2. The image processing device according to claim 1, wherein, in the first case or the second case, the interpolation correction processing unit corrects the output signal from the phase difference detecting pixel to be corrected, using the output signal from the imaging pixel which is arranged in a direction perpendicular to the phase difference detecting pixel to be corrected and detects the same color as the phase difference detecting pixel.

3. The image processing device according to claim 1, wherein the solid-state imaging element includes color filters that are provided on a plurality of pixels arranged in the two-dimensional array,
the array of the color filters includes an array pattern of a 3×3 pixel group in which first filters corresponding to a first color that most contributes to obtaining a brightness signal and second filters corresponding to two or more second colors other than the first color are arranged,
the first filters are arranged at a center and four corners in the 3×3 pixel group,
the array pattern is repeatedly arranged in a horizontal direction and a vertical direction,
the number of pixels of the first color corresponding to the first filters is greater than the number of pixels of the second colors corresponding to the second filters, and
the phase difference detecting pixel is provided in the pixel on which the first filter is provided.

4. The image processing device according to claim 2, wherein the solid-state imaging element includes color filters that are provided on a plurality of pixels arranged in the two-dimensional array,
the array of the color filters includes an array pattern of a 3×3 pixel group in which first filters corresponding to a first color that most contributes to obtaining a brightness signal and second filters corresponding to two or more second colors other than the first color are arranged,
the first filters are arranged at a center and four corners in the 3×3 pixel group,
the array pattern is repeatedly arranged in a horizontal direction and a vertical direction,
the number of pixels of the first color corresponding to the first filters is greater than the number of pixels of the second colors corresponding to the second filters, and
the phase difference detecting pixel is provided in the pixel on which the first filter is provided.

5. The image processing device according to claim 3, wherein the solid-state imaging element does not include an optical low-pass filter.

6. The image processing device according to claim 4, wherein the solid-state imaging element does not include an optical low-pass filter.

7. An image capture device comprising:
the image processing device according to claim 1; and
the solid-state imaging element.

8. An image capture device comprising:
the image processing device according to claim 2; and
the solid-state imaging element.

9. An image capture device comprising:
the image processing device according to claim 3; and
the solid-state imaging element.

10. An image capture device comprising:
the image processing device according to claim 4; and
the solid-state imaging element.

11. An image capture device comprising:
the image processing device according to claim 5; and
the solid-state imaging element.

12. An image processing method using the image processing device according to claim 1 that processes a captured image signal output from a solid-state imaging element including a plurality of imaging pixels and a plurality of phase difference detecting pixels which are arranged in a two-dimensional array on a light receiving surface, comprising:
a correction step of correcting each of output signals from the plurality of phase difference detecting pixels, which are included in the captured image signal, using a gain correction process of multiplying the output signal by a gain value to correct the output signal or an interpolation correction process of replacing the output signal from the phase difference detecting pixel with a signal that is generated using an output signal from the imaging pixel, which is arranged in the vicinity of the phase difference detecting pixel and detects a color which is the same color as the phase difference detecting pixel, to correct the output signal, wherein, in the correction step, the output signal from the phase difference detecting pixel to be corrected is corrected using the interpolation correction process, in a first case in which an edge of an object image that extends in a direction perpendicular to a direction in which a phase difference is detected by the phase difference detecting pixel is present in a determination area including the phase difference detecting pixel to be corrected and the plurality of imaging pixels which are arranged in the vicinity of the phase difference detecting pixel to be corrected and detect the same color as the phase difference detecting pixel to be corrected or a second case in which the edge of the object image that extends in the direction perpendicular to the direction in which the phase difference is detected is present in the determination area and overlaps the phase difference detecting pixel to be corrected.

13. A computer readable non-transitory recording medium storing an image processing program that causes a computer to process a captured image signal output from a solid-state imaging element including a plurality of imaging pixels and a plurality of phase difference detecting pixels which are arranged in a two-dimensional array on a light receiving surface, the recording medium causing the computer to perform: a correction step of correcting each of output signals from the plurality of phase difference detecting pixels, which are included in the captured image signal, using a gain correction process of multiplying the output signal by a gain value to correct the output signal or an interpolation correction process of replacing the output signal from the phase difference detecting pixel with a signal that is generated using an output signal from the imaging pixel, which is arranged in the vicinity of the phase difference detecting pixel and detects a color which is the same color as the phase difference detecting pixel, to correct the output signal, wherein, in the correction step, the output signal from the phase difference detecting pixel to be corrected is corrected using the interpolation correction process, in a first case in which an edge of an object image that extends in a direction perpendicular to a direction in which a phase difference is detected by the phase difference detecting pixel is present in a determination area including the phase difference detecting pixel to be corrected and the plurality of imaging pixels which are arranged in the vicinity of the phase difference detecting pixel to be corrected and detect the same color as the phase difference detecting pixel to be corrected or a second case in which the edge of the object image that extends in the direction perpendicular to the direction in which the phase difference is detected is present in the determination area and overlaps the phase difference detecting pixel to be corrected.

* * * * *